March 22, 1966 W. C. EDWARDS 3,242,409
SPEED AND ACCELERATION RESPONSIVE MOTOR CONTROL SYSTEM
Filed April 13, 1959 2 Sheets-Sheet 1

INVENTOR
WILLIAM C. EDWARDS
BY Hurwitz & Rose
ATTORNEYS

March 22, 1966 W. C. EDWARDS 3,242,409
SPEED AND ACCELERATION RESPONSIVE MOTOR CONTROL SYSTEM
Filed April 13, 1959 2 Sheets-Sheet 2
FIG. 3
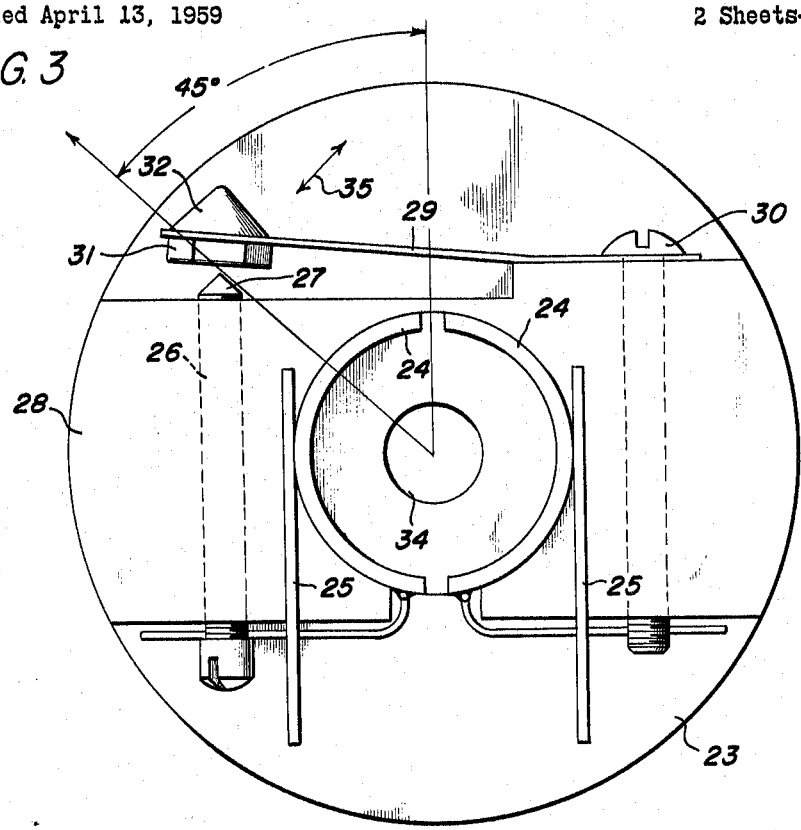
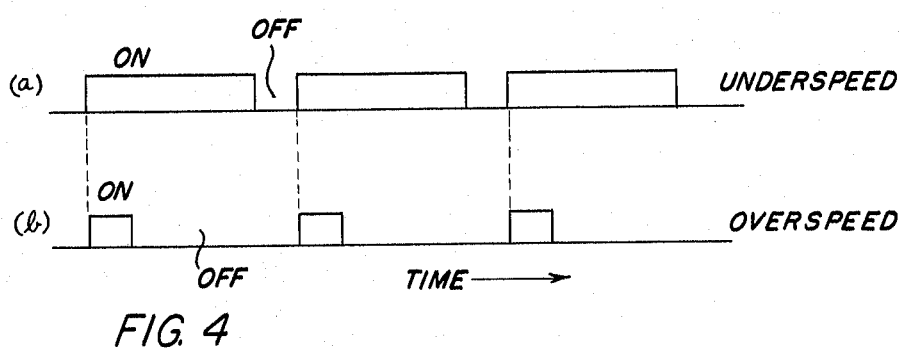
FIG. 4
INVENTOR
WILLIAM C. EDWARDS
BY *Hurwitz & Rose*
ATTORNEYS United States Patent Office 3,242,409
Patented Mar. 22, 1966

3,242,409
SPEED AND ACCELERATION RESPONSIVE
MOTOR CONTROL SYSTEM
William C. Edwards, 220 Circle Drive, Plandome, N.Y.
Filed Apr. 13, 1959, Ser. No. 806,098
4 Claims. (Cl. 318—325)

The present invention relates generally to motor control circuits, and more particularly to systems for controlling speed of a small direct current motor with extreme precision.

It is well known in the art of controlling running speed of direct current motors to utilize a centrifugal reed switch in series with the motor armature, the reed switch being normally closed when the motor starts, and opening on attainment of a predetermined speed by the motor. In such systems any tendency of the motor armature to depart from a preset speed is counterbalanced by the action of the reed switch. Speed control systems of this type have long term stability, but where the motor must operate under rapidly changing load conditions short term stability is frequently inadequate. Additionally, the reed is required to make and break armature current with consequent tendency to sparking. Moreover, such speed controls do not provide rate control, i.e., they respond only to average speed.

It is a feature of the present invention to provide both long term and short term speed stability in direct current electric motors, and simultaneously to eliminate sparking of reed type speed controls, and to provide rate controls as part of the speed control elements of the system.

According to the present invention, the armature of a direct current motor, which may be of the permanent magnet type, is connected in series with the collector to emitter circuit of a transistor. The armature may preferably be connected between the emitter and the source of energizing potential for the transistor, so that the transistor is connected as an emitter follower. However, connection in the collector circuit is also utilized. The reed circuit controls base potential of the transistor. The latter thus operates as a switching circuit under control of the reed, but the armature circuit is never physically interrupted, and the reed is employed only to control base voltage and current, which may be negligible in comparison with armature current.

Moreover, when the armature is connected in the emitter circuit of the transistor the latter operates as a unity gain device, and voltage across the armature tends to remain constant due to the self-regulating or feed-back characteristics of the circuit. This self-regulation is instantaneous, and hence imparts short term stability to the speed of the motor, additional to the long term stability that derives from the action of the reed switch.

The centrifugal reed switch speed control of the present invention is mounted for rotation with the armature of the motor and is connected thereto, in series therewith, by means of brushes and slip rings or a split ring. The reed switch includes a stationary contact and a movable contact, the latter being responsive to both speed and acceleration of the armature. To this end the movable contact or reed is made of a strip of spring material having a weight at its free end, which is also the contact making and breaking end of the reed. The reed may extend as a chord of the circle defining the armature of the motor, or parallel with such a chord, with its radius extending perpendicular to the chord and substantially bisecting same. A line drawn from the axis of the armature to the weight extends at about 45° to the line of the reed. It is this physical or mechanical feature of the reed arrangement which renders the reed switch both speed and acceleration responsive.

The reed switch is also made mechanically resonant to a frequency far above the rotary speed of the switch, i.e., by a factor of about twenty. In the usual centrifugal reed switch speed control for electric motors, the reed switch is solely speed responsive and tends to feather about a position corresponding with desired motor speed. In the present reed switch, the reed, by virtue of its resonant frequency, vibrates about a mean position determined by motor speed, opening and closing the motor circuit very rapidly, but with a "closed" duty cycle which is a function of motor speed, and which reduces as motor speed increases. The switch thus establishes average motor current in terms of relative ON and OFF times.

The reed switch is connected in series with a resistance, and a condenser is connected across the reed switch and resistance in series, and is in turn connected across the motor armature and collector to emitter circuit of the transistor above referred to, taken in series. The motor is connected in the collector-emitter circuit of the transistor. When the switch is open, then, the condenser charges up to full battery voltage, less the internal collector to emitter resistance of the transistor.

On the other hand, when the switch is closed, the condenser discharges through the switch and the resistance, which in turn increases the current to the armature by rendering the base more negative, with respect to the emitter.

The voltage across the armature is a function of its speed, but the changes which take place in this voltage due to the action of the condenser and the resistance are essentially those appropriate to a differentiating circuit, which provides a form of rate control for the motor.

The motor is then, according to the present invention, subjected to a plurality of rate controls as well as to a velocity control. The reed switch is both speed and rate responsive, by virtue of its mechanical structure, the voltage on the condenser is speed responsive since its average change is a function of ON-OFF duty cycle of the switch, and the circuitry of the motor control circuit provides an additional rate control. To all these effects may be added the effect of the transistor in the emitter follower configuration in compensating for short term speed changes.

I have found, by the adoption of all the expedients above referred to for accomplishing speed and rate control, that the controlled motor, even if it has a very small moment of inertia, is capable of speed constancy to better than 1% with negligible flutter.

It is, accordingly, a broad object of the present invention to provide a novel system of speed control for D.C. motors.

It is another object of the invention to provide a system for controlling speed of a D.C. motor by means of a speed responsive switch wherein the switch controls conductivity of a transistor, which in turn controls motor speed.

It is a further object of the invention to drive a D.C. motor by means of a transistor connected in series with the motor armature, wherein the transistor is operated in the emitter follower configuration.

It is another object of the invention to provide a system for controlling speed of a D.C. motor with both long term and short term stability, in response to a speed responsive switch, the latter controlling conductivity of a transistor which is connected in series with the motor armature and which operates in the emitter follower configuration.

It is a further object of the present invention to provide a novel centrifugal speed and acceleration responsive switch for electric motors.

It is another object of the invention to provide a novel centrifugal switch for controlling motor speed, the switch being mechanically resonant at a frequency in c.p.s. far above motor speed in r.p.s.

A further object of the present invention resides in the provision of a device for supplying high frequency duration modulated pulses to a motor armature, and to control motor speed by controlling pulse duration.

Another object of the invention is to provide a novel rate control circuit for electric motors, in which a condenser connected effectively across the motor armature is discharged through a resistance, on decrease of motor speed, to attain an initially rapid condenser discharge, and a consequent increase of motor current.

A further object of the invention resides in the provision of a motor speed and rate control circuit, employing mechanical speed control and both mechanical and circuital rate control devices.

The above and still further objects, features and advantages of the present invention will become apparent upon consideration of the following detailed description of one specific embodiment thereof, especially when taken in conjunction with the accompanying drawings, wherein:

FIGURE 3 is a view in front elevation of a rate and velocity responsive reed switch, utilized in the system of FIGURES 1 and 2; and FIGURE 4 is a plot as a function of time of ON-OFF duty cycle of the switch of FIGURE 3.

Figure 1:
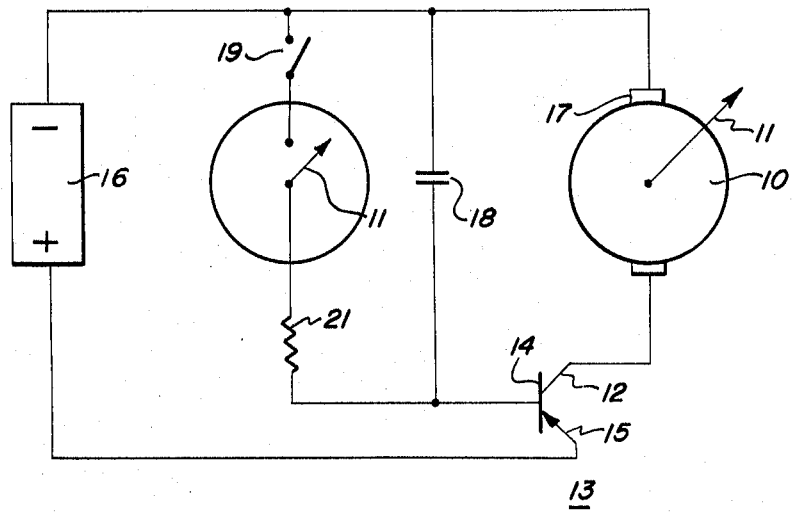
FIGURE 1 is a schematic circuit diagram of a first embodiment of the present invention.

Referring now more particularly to the accompanying drawings, the reference numeral 10 denotes the armature of a permanent magnet D.C. motor, which may be utilized to drive an inconstant load, such as the tape reel or capstan of a magnetic tape recorder and reproducer. Such loads require constant speed drive for recording and reproducing, both on a long term and a short term basis, if distortions of pitch and "wows" are to be avoided.

Secured to the motor in conventional fashion is a speed control reed switch 11. Employment of such reed switches for speed control of small motors is per se conventional, and they have been utilized in tape drives for magnetic tape reproducers, as in the U.S. patent to Goodwin 2,785,366. Further, reference is made to U.S. patents to Castagna 2,830,205, 2,705,299, Oliva 2,673,320, 2,691,127 and Buck 2,819,441 all of which disclose reed switch controlled D.C. motors. The location, mounting and construction and mode of operation of the reed switch, in the practice of the present invention, does not follow the prior art and is further described hereinafter.

One brush of the armature 10 is connected to the emitter 12 of a transistor 13, having a base 14 and an emitter 15. Emitter 15 is connected directly to the positive terminal of a voltage source 16, which may be of 1.5 v. battery, for example. The negative terminal of source 16 may be connected to brush 17 of armature 10.

Connected between the brush 17 and the base 14 is a condenser 18. Connected across the condenser 18, in series, is an ON-OFF switch 19, reed switch 11 and a resistance 21.

The condenser 18 and resistance 21 act as a filter, introducing a smoothing effect, so that despite rapid opening and closing of the reed switch 11, an average voltage appears across the condenser 18. This voltage controls the average conductivity of the transistor 13 and hence the average current flow to the motor armature 10.

In operation, when ON-OFF switch 19 is first closed, and assuming the armature 10 to be then stationary, reed switch 11 is closed 100% of the time. The transistor 13 is then biased to permit relatively heavy current to flow in its collector-emitter circuit and armature 10 commences to rotate and picks up speed rapidly. As the speed of the motor attains a value for which the ON time of the reed switch 11 decreases, due to its vibration, current flow to the base 14 is reduced. This in turn tends to continue to increase collector-emitter resistance, and thus to reduce voltage available to drive the motor armature 10. The reed switch 11 thus has a higher duty cycle when motor speed is below a preset value, which reduces as motor speed increases beyond that value, and which tends to maintain a desired average value when speed is at that value. Any change in motor speed thus gives rise to a compensating change average in motor current.

The system of FIGURE 1 provides the primary advantage that the motor armature 10 is permanently connected directly across the source 16, except for the interposition of the collector-emitter circuit of transistor 13. The action of reed switch 11 does not, therefore, effect arcing interruption of armature current. The reed switch 11, on the other hand, is required to interrupt only base current of transistor 13, which may be minute, i.e., 1 mil, when motor current is 100 mils. The entire system is therefore virtually sparkless. Moreover, the transistor 13 provides current gain, so that the control effect of the reed switch 11 is magnified. The total resistance of the transistor 13, when conductive, taken from collector to emitter, may be made so small as to be virtually negligible. The transistor thus consumes but little power and voltage, which is of extreme importance for operation of D.C. motors from sources providing as little as 1.5 volts, such as small batteries.

The system of FIGURE 1 would have a slight defect, for application to tape recorders and reproducers, were total reliance placed on the vibrating reed for speed control. While such speed controls are effective and accurate they do not provide adequate short term stability for some uses. This defect is particularly important in driving tape reels, since short term instability gives rise to "wows," or sudden pitch changes, in recording and/or reproduction.

Figure 2:
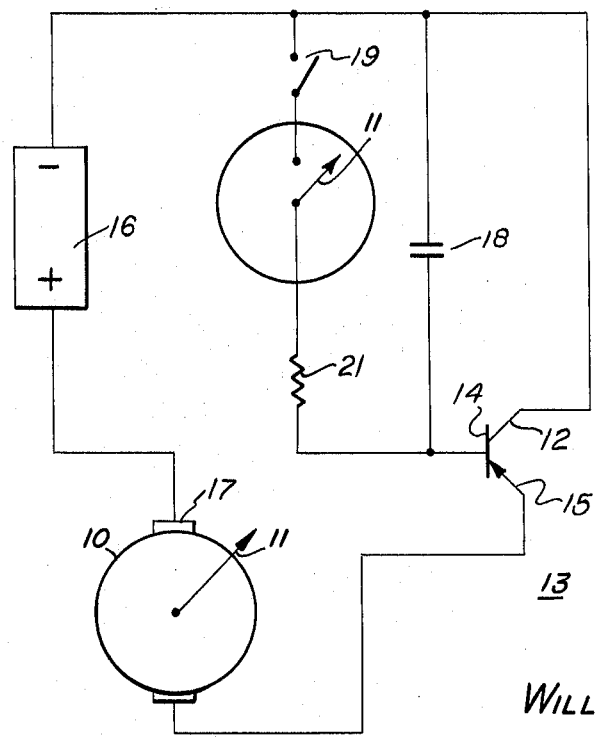
FIGURE 2 is a schematic circuit diagram of a modification of the system of FIGURE 1.

Short term as well as long term stability is attained in the system of FIGURE 2. The same numerals of reference are applied to FIGURES 1 and 2 to the same parts and components. Allowance, however, may be made for desired differences of time constants in the two systems.

In the system of FIGURE 2 the motor armature 10 is connected in the emitter circuit of transistor 13, the circuitry of FIGURE 1 being otherwise unchanged, when values of circuit elements are not considered. The modification gives rise to certain unexpected and especially advantageous results. Any change in armature current tends to be self-cancelling, because it is fed back to the base circuit in the proper sense to attain this result. If, for example, load on the motor were instantaneously increased, average current drain would tend to increase, and the motor would tend to decrease its speed, to permit back-E.M.F. to decrease sufficiently to permit the required current increase. In the system of FIGURE 2 this tendency for emitter current to increase effects a decrease in transistor collector-emitter impedance, which raises the total drive voltage available across the motor armature 10, and thus permits the motor back E.M.F. to increase to its original value, and the armature to rotate at its original speed. Obviously, an analogous but inverse set of reactions occurs if the armature tends to increase its speed.

The speed control effect due to inclusion of the armature in the emitter circuit of the transistor is instantaneous and continuous, so that in the system of FIGURE 2, two speed control devices are simultaneously active, which supplement each other at all times, one of which acts instantaneously to provide short term stability, while the other is particularly useful to impart long term stability.

The reed switch 11, illustrated in FIGURE 3 of the accompanying drawings, includes a rotary mounting 23, secured to the motor shaft and rotatable therewith. Mounted on the mounting 23, for rotation therewith, is a split ring 24, contacted by stationary brushes 25. Obviously, slip rings may be employed instead of a split ring. The brushes are connected to the motor and the transistor base, while the halves of the split ring 24 are connected to the stationary contact 25 and the movable or reed contact 26, respectively, of the centrifugal reed switch 11.

The contact 26 consists of a screw having a pointed head 27, which acts as the contact per se, and screw 26 threadedly engages a mounting 28, for adjustment of its position, which in turn changes the bias of the reed switch, and hence its operating characteristics.

The movable reed element includes an elongated flexible or resilient metallic reed 29, secured at one end 30 to the mounting 23, and including at its other end a contact plate 31, opposed to the end of screw 26. Secured to the reed 29 above the plate 31 is a weight 32. The weight 32 and the stiffness of the reed 29, together with its length, are so selected as to provide the desired mechanical resonant frequency at relatively high Q.

The reed 29 extends as a chord across the mounting member 23, perpendicularly to a radius drawn from the center of rotation 34 of member 23 to the approximate center of reed 29. The length of reed 29 is such that a line joining the center of rotation 34 to the weight makes an angle of about 45° with the first mentioned radius.

The material of which the reed 29 is fabricated, and the mass distribution and length of its component elements, are selected such that the reed has a natural frequency of vibration about twenty times motor speed, or more.

It follows that as the member 23 rotates uniformly, i.e., at constant speed, the reed 29 assumes a means attitude representative of motor speed, but vibrates about that means attitude at its resonant frequency. The ON-OFF duty cycle of the switch is then a function of motor speed, since the average position of plate 31 tends to separate from the contact 27 more and more as speed increases. As this separation increases, the average time during which contact is made decreases, or the relative durations of OFF time increase and of ON time correspondingly decrease (FIG. 4b). This results in a decrease of average current to the motor and a consequent compensating decrease of speed.

On the other hand if motor speed is low, the ON time is greater than normal and the OFF time less, as in FIGURE 4a, average motor current increases, and speed tends to increase.

In response to a change of speed, i.e., an acceleration, a component of acceleration of mass 32 exists in the direction of arrows 35, which causes the means position of reed 29 to change, during the acceleration, or while speed is changing and thus changing ON-OFF duty cycle of the switch. This aspect of switch operation gives rise to rate control of speed, i.e., to variations of armature current due to and during variations of speed from an average value, superposed on the values which exit as a function of average speed.

In adidtion to the short term stability provided by the transistor circuit, and the long term speed and rate controls provided by the reed switch 11, still another rate control is available in the present system.

The condenser 18 tends to assume an average value of voltage, during operation of the system. The switch 11 is, it is true, opening and closing at a high rate, but the resistance associated with condenser 18, i.e., resistance 21 and the base to emitter circuit of transistor 13, tend to smooth out variations of voltage.

Should the motor decelerate, however, the average charge on the condenser 18 would tend to decrease because the ON time of switch 11 would increase, permitting the condenser to discharge more rapidly than it charges. This increases motor speed, by increasing motor current in response to decrease of transistor resistance. The change of voltage across condenser 18 is, however, a function of rate in that the electrical change responds more rapidly than the motor can follow, and anticipates the response of the latter. A precisely opposite series of effects occur for the oppositely phased change of motor speed.

The system of the present invention accordingly provides long time speed stability in terms of average position of a rapidly vibrating centrifugal reed switch, absence of feathering action common to centrifugal reed switches of the prior art by taking advantage of reed vibration at high frequency, rate control due to switch construction, short term stability and absence of sparking due to the inclusion of a transistor in the speed control circuit, and rate control in the transistor circuitry.

Suitable values of circuit elements for the systems of FIGURES 1 and 2 are as follows:

Transistor type 2N138A.

The contacts 27, 31 (FIGURE 3) should both preferably be of excessively pure (Triple X) silver. This assures that (1) no contact differences of potential will arise, (2) no barrier layers will be generated at the contacts. Silver can be used because the contacts are not required to break any appreciable current. Most contact materials have the property of forming barrier layers, in course of time, which upsets the voltage and current relations of low voltage circuits sufficiently that operation becomes erratic.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a motor control circuit for a direct current motor, said motor having an armature, a transistor, said transistor having a base, an emitter and a collector, means connecting said armature in a series circuit including said emitter and said collector, a speed control reed switch arranged to open and close to an extent determined by speed of said armature, and means connecting said speed control reed switch in a circuit extending between said base and one of said emitter and collector, said reed being arranged and adapted to vibrate about a mean position at a frequency greater by at least five than the rotary frequency of said motor.

2. In a motor control circuit for a direct current motor, said motor having an armature, a transistor, said transistor having a base, an emitter and a collector, means connecting said armature in a series circuit including said emitter and said collector, a speed control reed switch arranged to open and close to an extent determined by speed of said armature, and means connecting said speed control reed switch in a circuit extending between said base and one of said emitter and collector, said reed controlled switch being adapted and arranged to open and close to an extent determined as a function of acceleration of said armature.

3. In a motor control circuit for a direct current motor, said motor having an armature, a transistor, said transistor having a base, an emitter and a collector, means connecting said armature in a series circuit including said emitter and said collector, a speed control reed switch arranged to open and close to an extent determined by speed of said armature, and means connecting said speed control reed switch in a circuit extending between said base and one of said emitter and collector, said reed being adapted and arranged to open and close to an extent determined as a function of both speed and acceleration of said armature and to vibrate about its mean position at a frequency at least several times the rotary frequency of said armature.

4. A speed control system for a D.C. motor, said motor having an armature, first and second brushes for conducting current to and from said armature, a transistor, said transistor having a collector, an emitter and a base, a reed switch responsive to rotation of said armature to open to a mean position representative of speed of said armature, a source of direct current having a first terminal and a second terminal, means connecting said first terminal to said collector, means connecting said first brush to said emitter, means connecting said second brush to the other terminal of said source, a condenser connected between said base and said collector, and means including a resistance connecting said reed switch between said collector and said base and in parallel with said condenser, said reed switch being arranged and adapted to vibrate about its mean position at a natural frequency at least several times a desired speed of said armature, the extent of vibration being adequate to open and close said switch at said frequency for a wide range of speeds of said armature.

References Cited by the Examiner
UNITED STATES PATENTS

| | | | |
|---|---|---|---|
| 1,647,020 | 10/1927 | Schmidt | 318—325 |
| 1,807,209 | 5/1931 | Herzug | 318—325 |
| 1,954,884 | 4/1934 | Mears | 318—325 |
| 2,010,577 | 8/1935 | Wilson | 318—325 |
| 2,175,837 | 10/1939 | Hanna | 318—325 |
| 2,189,633 | 2/1940 | Hanna | 318—325 |
| 2,456,979 | 12/1948 | Merrill | 318—325 |
| 2,670,416 | 2/1954 | Masheris et al. | 200—80 |
| 2,738,391 | 3/1956 | Tesh | 200—80 |
| 2,819,441 | 1/1958 | Buck | 318—325 |
| 2,883,598 | 4/1959 | Tamm | 318—352 |
| 2,894,192 | 7/1959 | Sherwood | 318—325 |

JOHN F. COUCH, *Primary Examiner.*

M. O. HIRSHFIELD, *Examiner.*